(12) United States Patent
Bromley et al.

(10) Patent No.: US 7,099,900 B1
(45) Date of Patent: Aug. 29, 2006

(54) MAPPING DRIVER FOR USE IN DATA BACKUP SYSTEMS

(75) Inventors: Graham Bromley, Dublin, CA (US); Weibao Wu, Roseville, MN (US)

(73) Assignee: VERITAS Operating Corporation, Mountain View, CA (US)

( * ) Notice: Subject to any disclaimer, the term of this patent is extended or adjusted under 35 U.S.C. 154(b) by 340 days.

(21) Appl. No.: 09/952,780

(22) Filed: Sep. 13, 2001

Related U.S. Application Data (60) Provisional application No. 60/232,245, filed on Sep. 13, 2000.

(51) Int. Cl.
  *G06F 12/00* (2006.01)
  *G06F 17/30* (2006.01)
  *G06F 7/00* (2006.01)

(52) U.S. Cl. .................. 707/204; 707/205; 707/102
(58) Field of Classification Search ............... 707/204, 707/9, 205, 102; 709/10; 714/4; 345/700
See application file for complete search history.

(56) References Cited

U.S. PATENT DOCUMENTS

| | | | |
|---|---|---|---|
| 5,592,638 A | | 1/1997 | Onodera |
| 6,026,414 A | * | 2/2000 | Anglin .................. 707/204 |
| 6,363,385 B1 | | 3/2002 | Kedem et al. |
| 6,421,711 B1 | | 7/2002 | Blumenau et al. |
| 6,460,113 B1 | * | 10/2002 | Schubert et al. ............ 711/111 |
| 6,502,162 B1 | | 12/2002 | Blumenau et al. |
| 6,538,669 B1 | * | 3/2003 | Lagueux et al. ............ 715/764 |
| 6,553,408 B1 | * | 4/2003 | Merrell et al. .............. 709/213 |
| 6,671,820 B1 | * | 12/2003 | Kelman ......................... 714/4 |

OTHER PUBLICATIONS

Oracle7™ Enterprise Backup Utility Administrator's Guide, Release 2.2, Sep. 19, 1997, Oracle Corporation.*

(Continued)

*Primary Examiner*—Greta L. Robinson
*Assistant Examiner*—Kuen S. Lu
(74) *Attorney, Agent, or Firm*—Meyertons Hood Kivlin Kowert & Goetzel, P.C.; B. Noël Kivlin (57) ABSTRACT

A Storage Mapping Driver (SMD) that provides a system and method for determining the application host storage locations of file data so that the file data can be later backed up directly from its storage media. The application host location of the file data is sent to the backup host either just prior to a backup or as the information is obtained. In this way the backup host is capable of backing up the files without reference to systems on the application host such as the file system manager and the volume manager. The SMD invokes the file system manager and/or the volume manager to read a file to be backed up in order to obtain a file map. If the host system does not have a file system manager and/or a volume manager, a backup file system manager is provided, which is invoked by the SMD to read a file to obtain a file map for use during a backup. The file system manager, volume manager and/or backup file system manager communicates with a disk device driver, which in turn reads the application host storage data of the file. The application host storage data includes one or more disk media names and one or more application host disk addresses of the file to be backed up. Once the disk device driver reads the entire file, the application host storage data is stored and the backup host can backup the file from the storage media to a backup media using only the application host storage data to identify the file.

38 Claims, 7 Drawing Sheets

OTHER PUBLICATIONS

Principles of Enterprise Storage Management, IBM, Mar. 1999.*
Legato NetWorker® Administrator's Guide, Unix® Version, Jan. 2000.*
Oracle7™ Enterprise Backup Utility Administrator's Guide, Release 2.2, Sep. 19, 1997, Oracle Corporation☐☐(Previously provided).*
Principles of Enterprise Storage Management, IBM, Mar. 1999 (Previously provided).*
Oracle7Ò Server Concepts, Release 7.3, Feb. 1996, Oracleâ.*
Legato Network® Administrator's Guide, Unix® Version, Jan. 2000 (Previously provided).*

* cited by examiner

MAPPING DRIVER FOR USE IN DATA BACKUP SYSTEMS

CROSS REFERENCE TO RELATED APPLICATIONS

This Application claims the benefit of the priority of U.S. Provisional Patent Application Ser. No. 60/232,245 filed Sep. 13, 2000 entitled, "MAPPING DRIVER FOR USE IN DATA BACKUP SYSTEMS," by Graham Bromley and Weibao Wu, assigned to VERITAS Operating Corporation.

BACKGROUND OF THE INVENTION

1. Field of the Invention

The present invention relates generally to backing-up data in a Storage Area Network (SAN) and more particularly to mapping logical files to application host disks in data backup systems.

2. Description of the Background Art

In the prior art a volume is an application host location where a group of one or more files are stored. A file system refers to the structure and arrangements of the files on a computer, a system of computers, or within a portion of a volume. A volume may contain multiple file systems and a file system may span multiple volumes. A file system manager sets up and manages the file system. A volume manager sets up and manages the volumes.

A backup object includes an object identified in a backup class of a program. The backup object may be a tablespace, file, or volume. A backup client is an application on the application host that builds a data map of the objects that comprise the backup data source. The data map associates a file system's logical objects with locations of file or volume data on application host disks. Files and volumes are logical objects managed by file system managers and volume managers.

The data map includes lists of the extent of each storage (to be referred to as storage extents or Storage Extent Descriptors (SEDs)) that identify an absolute disk address, a count of the number of blocks that follow, and a device name. The backup client on the application host then transmits that map to a backup server running on a second host. A block has an address known to the file system by its block number. A block number is the ordinal of the block relative to the start of the file system, which in turn is the start of the volume associated with the file system. This block address is called a volume-relative address because it is computed from the beginning of the volume.

A SAN in a distributed environment often includes numerous computers connected to various storage devices so that any one of the computers can access any one of the disk or tape drives. Such devices include Symmetrix produced by EMC of Hopkinton, Mass.

The SAN leads to a desirable ability to reduce backup overhead on the application host computer by delegating the work of data backup and by reducing manual administrative operations. Commonly, an application host computer delegates to a back up host the task of backing up and storing the data of the application host to the storage devices. In this way, the task of moving data from disk to offline media can be performed without interrupting operations of the application host.

One disadvantage of prior art methods for building maps of logical objects is that such methods are very limited in scope because they are tailored to specific file systems and depend significantly on individual operating systems. For example, a technique arranged between Legato and Hewlett Packard (HP) is highly specific to the HP systems. Further, Legato's original prototype was implemented in the Solaris Unix File System (UFS) and required that Legato have access to the UFS source code. Thus, the prior art does not provide a mapping method that can be used efficiently with different operating systems, file systems and volume managers.

Another disadvantage of prior art backup systems includes the requirement that the backup host access the file system and/or volume manager on the application host during the backup process, thereby slowing down the backup and the application running on the application host.

Therefore what is needed is a system and method that overcomes the disadvantages of the prior art.

SUMMARY OF THE INVENTION

The present invention includes a Storage Mapping Driver (SMD) that provides a system and method for determining the application host storage locations of file data so that the file data can be later backed up directly from its storage media. The application host location of the file data is sent to the backup host either just prior to a backup or as the information is obtained. In this way the backup host is capable of backing up the files without reference to systems on the application host such as the file system manager and the volume manager. The SMD invokes the file system manager and/or the volume manager to read a file to be backed up in order to obtain a file map. If the host system does not have a file system manager and/or a volume manager, a backup file system manager is provided, which is invoked by the SMD to read a file to obtain a file map for use during a backup. The file system manager, volume manager and/or backup file system manager communicates with a disk device driver, which in turn reads the application host storage data of the file. The application host storage data includes one or more disk media names and one or more application host disk addresses of the file to be backed up. Once the disk device driver reads the entire file, the application host storage data is stored and the backup host can backup the file from the storage media to a backup media using only the application host storage data to identify the file.

Other advantages and features of the present invention will be apparent from the drawings and detailed description as set forth below.

DETAILED DESCRIPTION OF THE INVENTION

The invention provides a storage mapping driver for use in backing-up disk data in a SAN (SAN).

It may be tempting to find or discover the file systems and the volume configurations of the application host system and then replicate them onto the backup host. However, discovering and replicating is "messy" and difficult to implement for a general case. To discover a volume configuration it may be necessary to query a non-standard API, for example the VERITAS extended Volume Manager (VxVM) Toolkit. The file system and volume manager hinder the use of raw device change history such as that of the EMC Symmetrix (SMX) raw track history. The discovery method only relates logical data object handles to application host storage handles, giving no block level mapping. The lack of block level mappings makes this method unusable for obtaining a file map for use by the backup host without some other way of obtaining the block level mapping.

Figure 1:
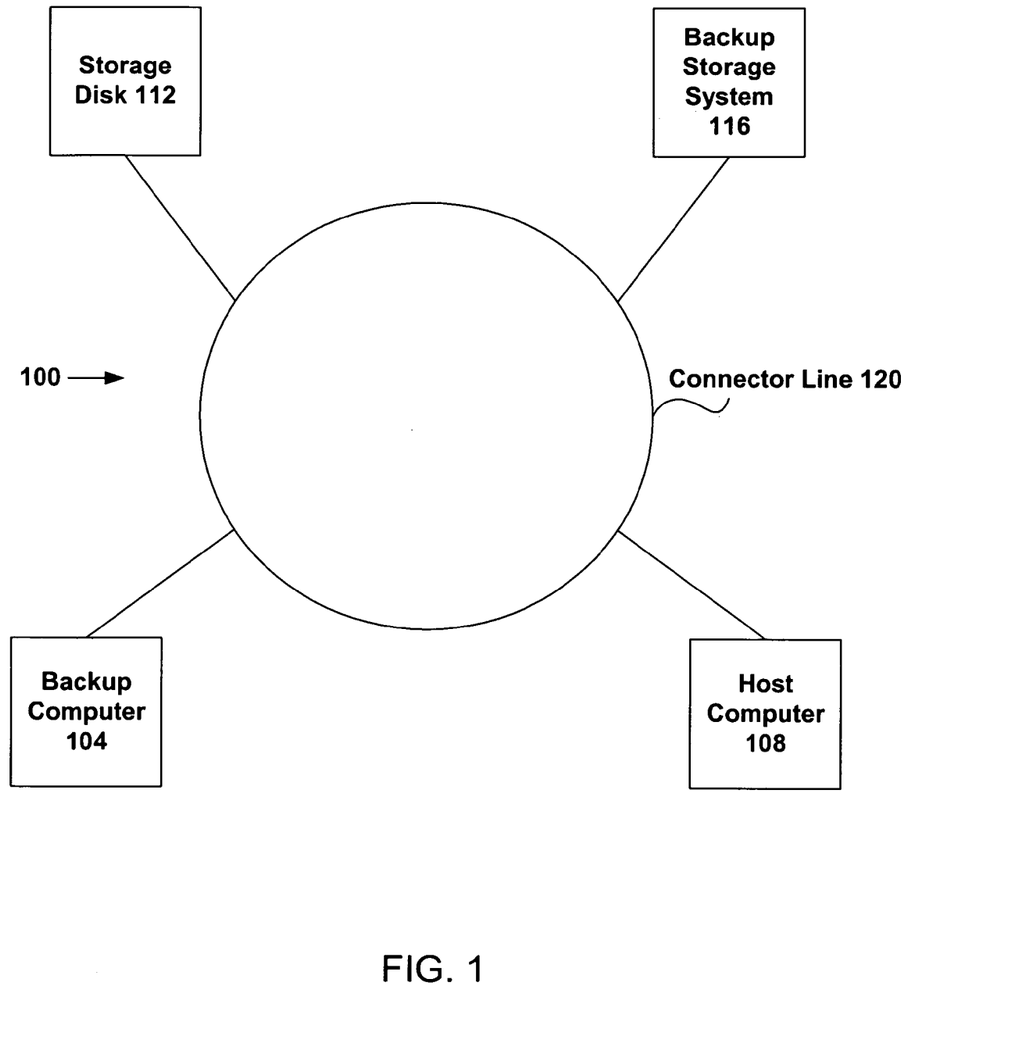
FIG. 1 is a block diagram of a SAN (SAN)

FIG. 1 shows a SAN 100 embodying the invention. FIG. 1 is only an overview of the system of the invention, the SAN 100, which includes a backup host computer 104, where the backup server runs, application host 108, a second host which is an application host 108 where the backup client runs a storage system 112, and a backup storage system 116, all interconnected by a connector line 120. The invention lies primarily in the details of the host computer 108, which are described below in conjunction with FIG. 2.

Even though SAN 100 shows one element for each network element type (e.g., backup computer 104, application host 108, storage system 112, and backup storage system 116), the invention is applicable for a plurality of elements of each element type.

Backup computer 104 and host computer 108 may be any conventional computer such as a personal computer (PC), a Hewlett Packard workstation, or a Sun desktop computer, capable of running standard operating systems such as the SUN Operating System, Microsoft Windows NT®, or Hewlett-Packard HP-UX®.

The storage system 112 can be any storage system such as a long term storage system. An example of a long term storage system is a disk drive system, which may include one or more storage disks, for example. Storage system 112 stores computer data such as application programs and program data created and managed by the application host 108. A file containing user data is presented to application programs by the file system as a linear sequence of bytes. An application program accesses a specific byte in the file by specifying to the file system the file name and a logical offset in the file.

The backup storage system 116 can be any type of long term storage system such as a tape drive system that includes one or more tape drives. Backup storage system 116 stores data backed-up from storage system 112. Backup storage system 116 is under the control of the backup server on backup computer 104. Connector line 120 connects network elements (e.g., one or more of backup computer 104, host computer 108, storage system 112, and backup storage system 116). Connector line 120 may be a bus or a loop, for example, such as a fiber loop (or fabric), or any network that can accommodate storage devices, such as multiplexed Small Computer Systems Interface (SCSI) or switched High Performance Parallel Interface (HIPPI). Using high speed connectors such as fiber optic loops for connector line 120 helps facilitate keeping the backup files and/or mirror files in synchronization with the actual files when necessary.

Figure 2:
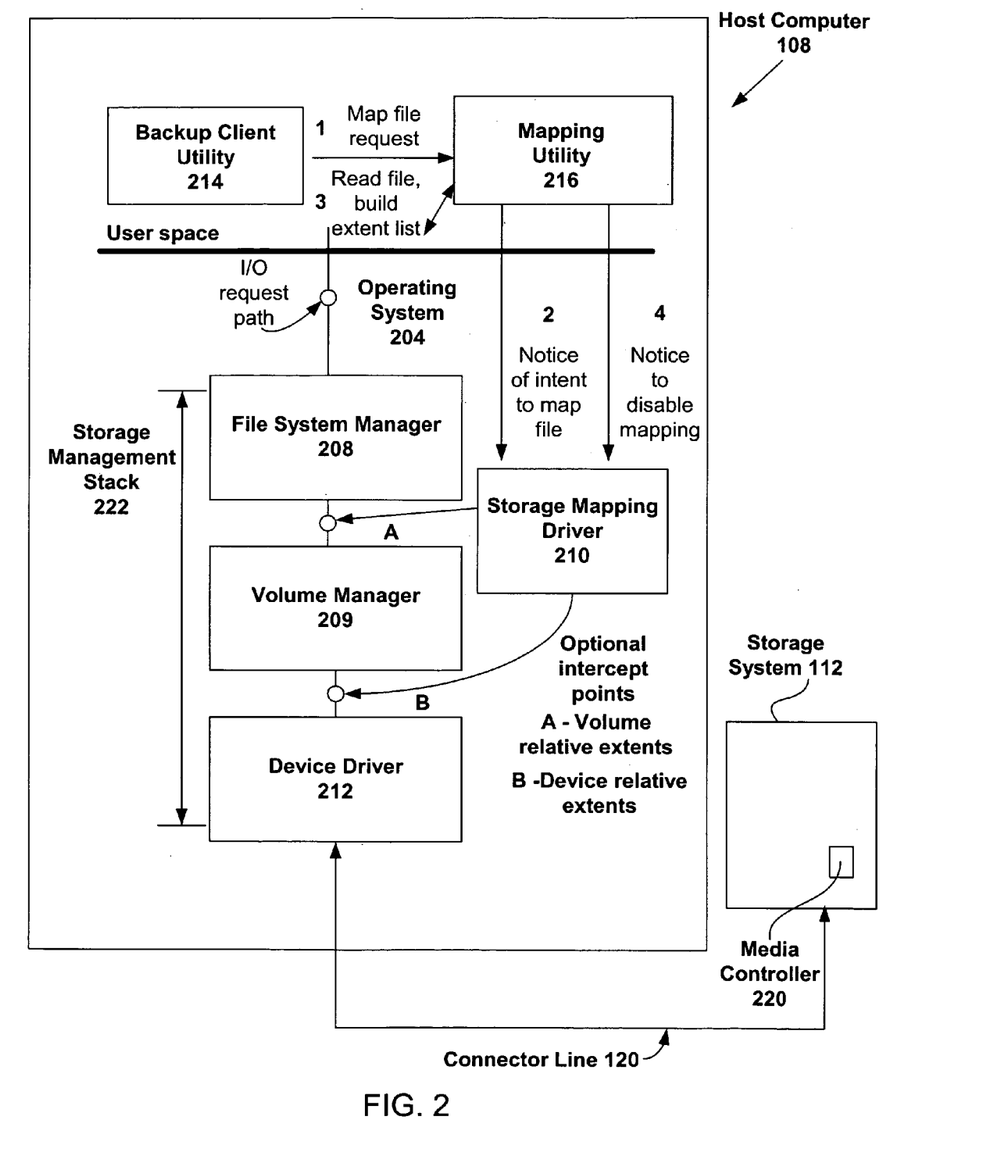
FIG. 2 is a block diagram of the storage management software stack on a host computer interfacing with a storage disk.

FIG. 2 shows the application host 108 (FIG. 1) interfacing with the storage system 112 (FIG. 1) via connector line 120. Briefly, application host 108 executes an operating system 204 that includes various software files that manage access to data on the storage media of storage system 112, such as a file system manager 208, a volume manager 209, a Storage Mapping Driver (SMD) 210, and a device driver system 212. The host computer 108 also executes a backup client utility 214 and a mapping utility 216. Alternatively, host computer 108 may have only one of the file system manager 208 or volume manager 209.

The operating system 204 may be Solaris®, a product of Sun Microsystems, Inc. of Mountain View, Calif. However, in accordance with the invention, operating system 204 may be any operating system, such as Windows NT® or HP-Unix®.

The file system manager 208 is responsible for the on-disk organization of data into a hierarchy of directories and files with attributes such as names, ownership and security. Further, the file system manager 208 is responsible for allocating and deallocating disk volume space associated with directories and files. File system manager 208 and volume manager 209 are included in storage management stack 222. Storage system 112 includes media controller 220.

A file system is managed by file system manager 208 as an allocation of space within a volume. File systems can be further subdivided into files and directories by the file system manager 208. Files occupy space within a file system. The file system manager 208 is responsible for allowing files to grow and shrink on demand from user input/output requests. Space for file growth is allocated by the file system manager in units called blocks. A volume appears to a file system manager as a contiguous allocation of disk blocks. However, a volume can be associated with one or more devices. A volume can be a grouping of disk devices, each device itself being an addressable storage device. Consequently, a block address that is volume-relative cannot be used as the basis for an input/output request at the device level without determining which device corresponds to the volume-relative address and calculating the device-relative address of the request.

The volume manager 209 is responsible for organizing disk equipment connected to a computer into manageable storage units called volumes. The volume manager 209 typically provides a variety of services including disk concatenation and disk striping.

SMD 210 is a software or hardware module, structured as a driver and installed beneath elements (e.g., file system manager 208 or volume manager 209) of a storage management stack 222 that is responsible for the type of mapping to be performed. An advantage of using a software version of the SMD 210 is its ease of installation and that it can more easily be used with many different systems without worrying about the details of the hardware of the system. If the SMD 210 is not installed, when files are to be mapped SMD 210 is installed beneath (i.e., closer to the hardware) file system manager 208, and when volumes are to be mapped SMD 210 is installed beneath volume manager 209. Alternatively, the SMD 210 may be permanently installed but is programmed so that it is not active until a file or volume needs to be mapped. If a file needs to be mapped, the SMD 210 activates itself to function beneath file system manager 208, and if a volume needs to be mapped SMD 210 activates itself to function beneath volume manager 209. This may be accomplished by installing two copies of SMD 210. One of the two copies is installed beneath the volume manager 209 and one is installed below the file system manager 208, with only the necessary copy or copies of the SMD 210 activated. Alternatively, a file can be mapped by installing one SMD 210 that when active is configured to intercept data from the only one or ones of the volume manager 209 and file system manager 208 necessary.

Device driver system 212 includes one or more device drivers, which in turn include one or more storage device drivers such as a disk drive or tape drive.

Media controller 220 controls the hardware of storage system 112. For example, if storage system 112 is a storage disk drive system, media controller 220 is a disk controller that controls the disk or disks of the disk drive system. Device driver 212 sends instructions to media controller 220.

The storage management stack 222 within operating system 204 can be a storage management stack, and includes file system manager 208, volume manager 209, and device driver system 212. The overriding logical structure managing the file system is called the file system manager 208. The overriding logical structure managed by the volume manager 209 is called a volume. Device drivers are the most primitive software elements and are responsible for moving data (read or write) to individual disk devices. Individual storage devices such as disk devices can be amalgamated into volumes. File systems are built on top of (within or spanning several) volumes. The file system manager 208 calls the volume manager 209, which in turn calls the device drivers of device drive system 212.

SAN 100 facilitates a process wherein the backup server on host computer 104 backs up data that was created and managed on the application host 108 without assistance from the file system manager 208. The backup object is mapped into application host extents on application host 108 using its storage management stack 222. The use of storage management stack 222 on the application host 108 removes the need to replicate the storage management stack 222 of the host on backup host 104. The backup process includes the reading of data on storage system 112 from backup host 104 and then writing the data to part of the backup storage system 116. By using storage management stack 222 for file mapping the backup server on host 104 does not need to know the files or volumes of application host 108. A further benefit of using storage management stack 222 for file mapping is that the data transfer rates between the storage system 112 and the backup storage system 116 are the same as they would be if application host 108 moved the data. The backup client facilitates the backup process by running on application host 108.

The application host 108 builds a data map using SMD 210. The SMD 210 associates files and volumes that are created and managed on the application host 108 with their application host disk addresses on storage system 112. By installing SMD 210 into the storage management stack 222 of an operating system 204, either beneath a file system manager 208 or beneath a volume manager 209, SMD 210 is able to intercept Input/Output (I/O) requests directed to a lower layer of the storage management stack 222. The mapping driver 210 intercepts read requests from a mapping utility in user space in order to provide responses. Then, instead of returning the data to be read to the backup host 104, SMD 210 returns the application host storage extents or disk addresses of the data associated with the read request to the backup host 104. A storage extent in this context is the starting address of the request and the number of blocks to read. SMD 210 on the application host 108 returns a stream including the name, node attributes, and storage extent descriptors to the backup host 104. By reading through the entire file or volume, the mapping utility accumulates the extents returned on each read request as a list. The complete list of extents constitutes a map of the blocks of the file or volume. The data map is provided to the backup server on host computer 104. The backup host 104 then uses this data map to back up data for application host 108.

Backup host 104 reads data directly off the raw devices. Exactly the same stream of disk reads, in the same sequence, are used as would be used were the file system and volume manager reads performed on the backup host 104. AND'ing a storage extent descriptor bitmap with the storage device bitmap of changed blocks obtained from SYMAPI or equivalent gives the changed blocks in the backup object and their logical offsets, irrespective of the type of file system manager 208 and volume manager 209.

A function of the volume manager 209, as it receives requests from the file system manager 208, is to resolve volume-relative addresses into device-relative addresses. SMD 210 can use the volume-relative addresses to obtain the extents and map the volume. To understand SMD 210 it is useful to understand how a file is physically distributed in memory.

Figure 3:
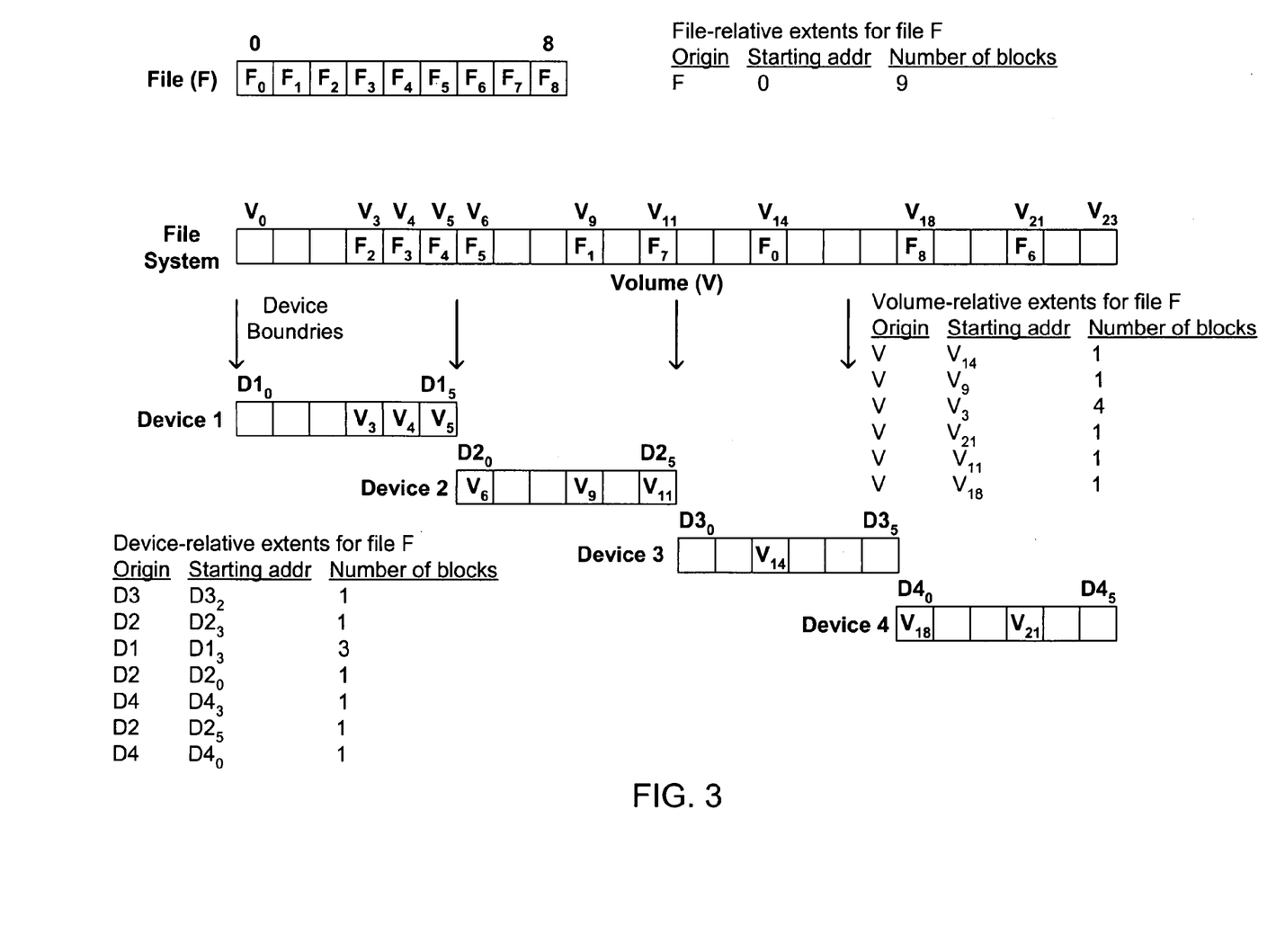
FIG. 3 is a block diagram of a file and volume structure with an example of storage extents.

FIG. 3 illustrates how a file, managed by file system manager 208 for a file system that appears as a continuous string of blocks to a user process, is actually distributed in a random way across a volume and across the devices that make up the volume. In this example a file F consists of blocks F0 through F8. From the standpoint of a user process, the extent that describes file F is the name of the file with a starting address of zero and a block count of nine. The actual blocks of file F are scattered randomly across volume V. FIG. 3 shows how blocks of file F might be allocated to random blocks within volume V. The volume-relative extents for file F consist of the name of the volume and the starting address and number of blocks for every block allocated to file F. In this example, volume V is composed of four disk drive devices (D1 through D4) that are concatenated together to form volume V. The device-relative extents consist of the origin device name, the starting address and the number of blocks for every block allocated to file F.

When a user process issues an input/output request, the top layer of operating system 204 processes the request and sends it to the file system element 208. The file system element parses the request and, typically, extracts the name of the file and the range of blocks affected (to read or write) by the input/output request. Block addresses are calculated on a volume relative basis. The file system manager 208 changes the user input/output request into a low-level request and passes it to the volume manager 209. The volume manager converts the volume-relative addresses into device-relative address and passes the request to the device driver system 212.

The SMD 210 functions by intercepting requests at an appropriate level of the storage management stack 222 and then examining the block addresses of the input/output requests. If it is desired to extract volume relative addresses, the SMD 210 intercepts requests coming out of the file system element 208. If it is desired to extract device relative addresses, the SMD 210 intercepts requests coming out of the volume manager. SMD 210 may intercept only one or both requests coming out of file system manager 208 and volume manager 209.

SMD 210 works in concert with a mapping utility 216. When a driving application such as a backup client 214 on the application host 108 seeks to map a file, a request is made to a user space mapping utility 216. This request opens the file for read access and, using an input/output control (ioctl) request, tells SMD 210 that all subsequent reads on the named file and originating from the mapping utility 216 are mapping-reads. Mapping-reads return the read request block addresses instead of the data as would be returned by a normal read. After the file has been read from beginning to end (and thereby fully mapped), another ioctl request is sent by the mapping utility 216 to SMD 210 to disable mapping reads.

The accumulation of block addresses, returned while performing the mapping reads, is passed as a list to the backup client 214, which then passes the list to the backup server computer 104 for backup. Backup is performed from backup server computer 104 by reading data directly from the storage media of storage system 112 according to the list generated while mapping.

By reading every file in the file system or by reading an entire volume, SMD 210 can produce complete file maps. Disk driver 212 is a system of software programs including a program controlling media controller 220 of storage system 112. A file system manager 208 invokes a driver from device driver system 212 that interfaces with media controller 220 in order to control the actual hardware of storage system 112.

The file system code of file system manager 208 can be used in the application host 108's storage management stack 222 to map the host file system to thereby form the backup file system, mounted over the mirror disks (Backup Control Volume (BCV)'s or equivalent). The application host 108's volume manager code can be used as well, if the volume configuration does not change in certain ways while mapping. For example, new disks can be added to the volume, but the application host 108's volume manager 209 cannot be used when deleting all original disks from the volume.

Figure 4:
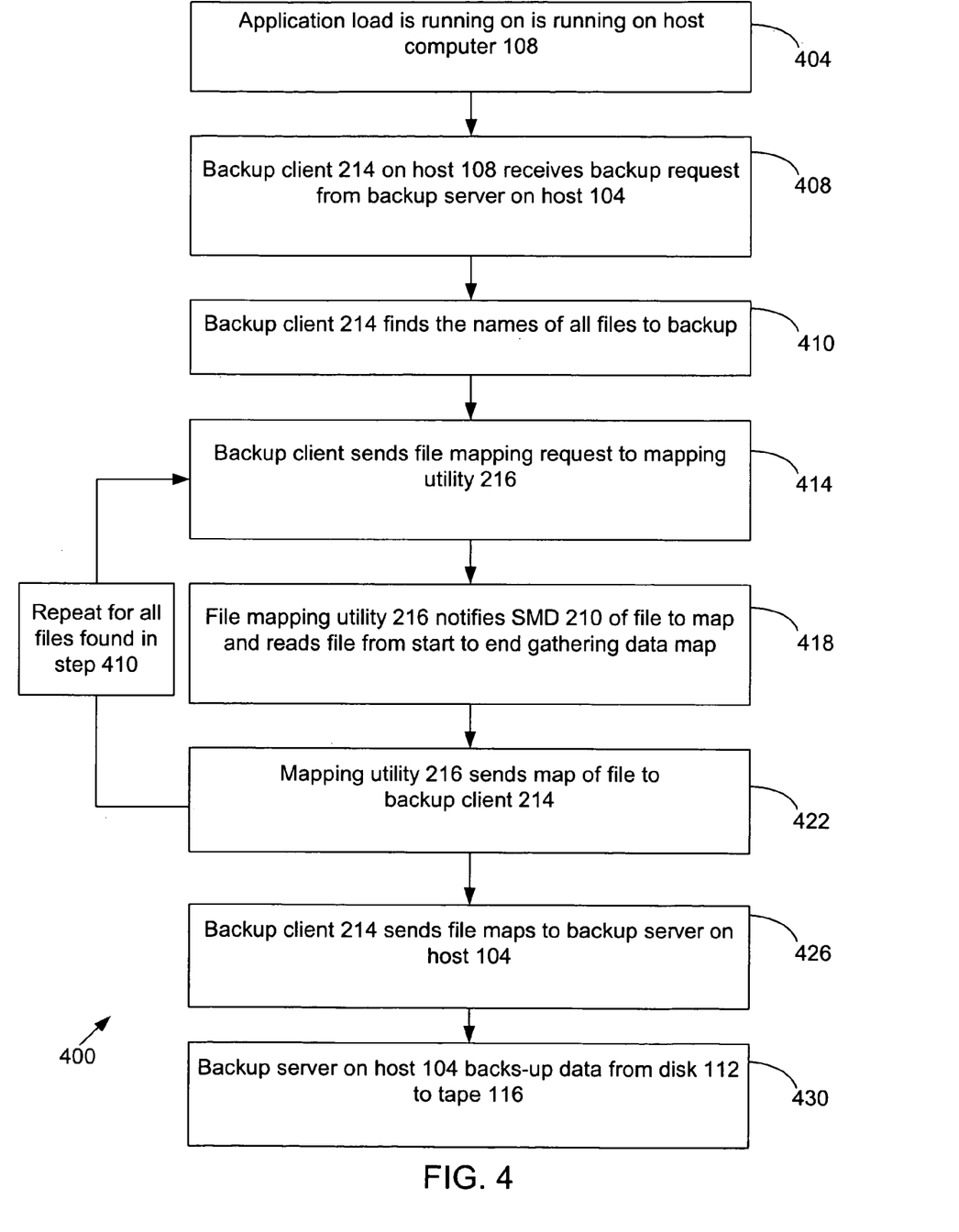
FIG. 4 is a flowchart illustrating the steps in a method according to the invention.

FIG. 4 is a flowchart illustrating steps of a method 400 in accordance with the invention. Beginning in step 404, an application workload is running on application host 108. In step 408 the backup host computer 10 sends a request to the backup client 214 running on application host 108 to schedule a backup operation on application host 108. In a step 410, the backup client 214 on application host 108 responds to the backup request and, using any file system inquiry interfaces, determines all of the files in the file system to be backed up. The type of file system inquiry interface may be standard. In step 414, the backup client 214 sends a mapping to the mapping utility 216 and in step 418 the mapping utility sends a request to the SMD 210 to indicate that mapping will occur. The mapping utility 216 then reads the file from beginning to end. The mapping utility 216 may use a direct input/output method to read the files so that the read is not buffered in the file system manager 208, but is not limited to a direct input/output method. Each read is intercepted by the SMD 210, which returns the address of the data to be read instead of the data itself. The mapping utility 216 accumulates the addresses (storage extents) returned by the SMD 210.

In step 422, the mapping utility 216 sends the file map back to the backup client 214 and informs the SMD 210 that mapping for the file is complete. In optional step (not shown) control is returned to step 414 so that steps 414, 418 and 422 are repeated sequentially for every file determined in step 410. Alternatively, steps 414, 418 and 422 are done concurrently for each file. In step 426 the backup client 214 sends the accumulation of individual file maps to the backup server on backup host 104. Once the file maps have been sent to the backup server on host 104, the backup server on host 104, having the data map for the backup, transfers data from storage system 112 to backup storage system 116 in step 430.

The SMD 210 advantageously provides a method for determining the extents of a file or volume without requiring specific knowledge of the individual components of the storage management stack. System 100 (FIG. 1) relies on the standard capability of leading operating systems to accommodate the installation of drivers in the storage management stack and uses SMD 210 for data backup. SMD 210 supports an improvement in the efficiency of backup by allowing the input/output associated with a backup to be exported from the application host to a backup host. SMD 210 facilitates the process by providing a portable mechanism that can be employed on all leading implementations of UNIX (Solaris, HP-UX, AIX) and on Windows NT® for decomposing files and volumes into extent lists. By exporting the input/output associated with backup, the application host can devote more of its resources to running the application load.

Figure 5:
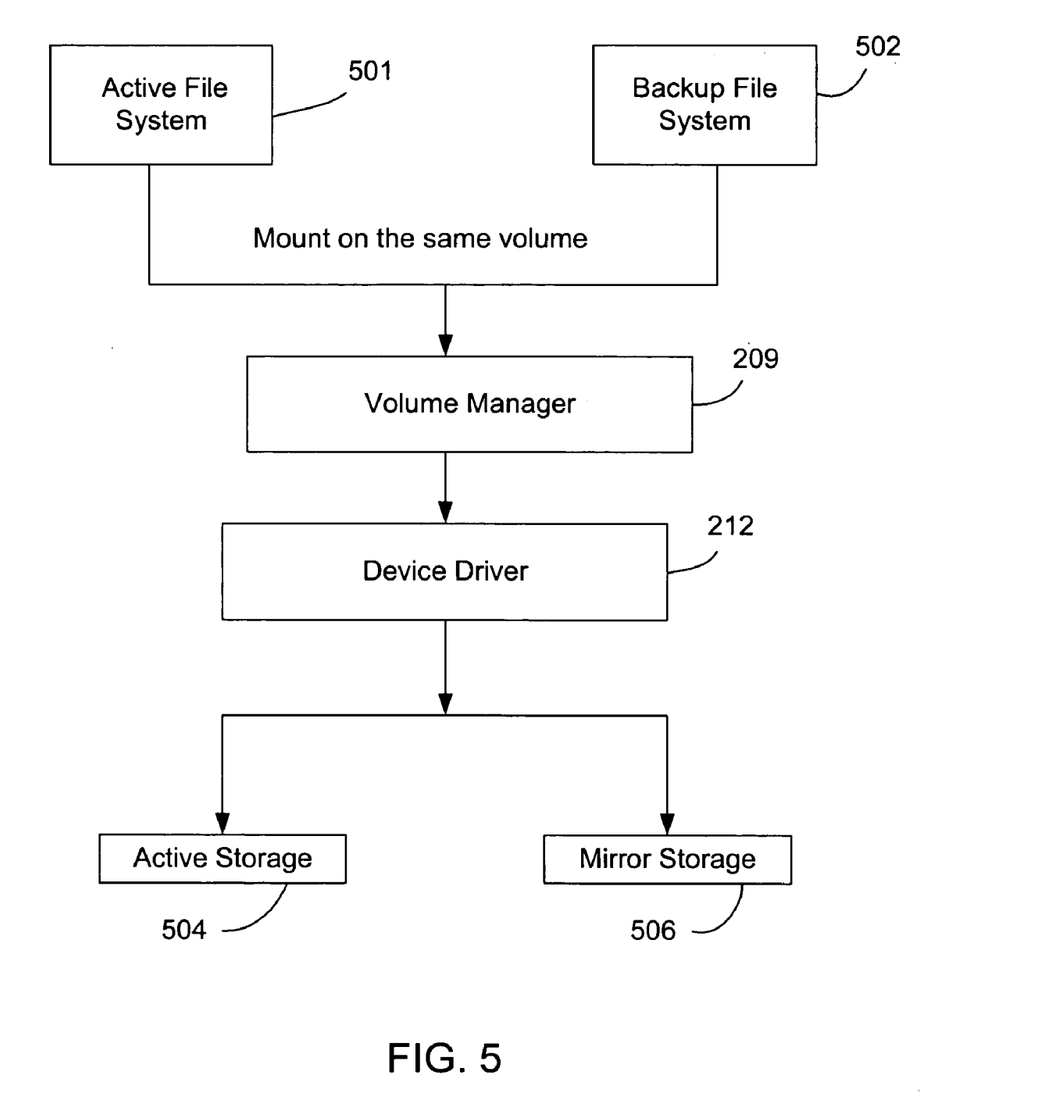
FIG. 5 is a flow diagram of a method according to the invention.

FIG. 5 is a block diagram showing the data flow during a backup. The input/output streams of the backup file system 502 and the active file system 501 are directed by the volume manager 209 through the device driver system 212 onto the active storage 504 and mirror storage 506.

Both the active storage 504 and mirror storage 506 are located in storage system 112 and may be located on the same or different storage devices. To do this backup the file system 502 should be mounted on the same volume as the active file system 501. Mounting the backup file system 502 on the same volume as the active file system 501 can be facilitated because a volume manager 209 does not cache blocks since caching is a file system responsibility, and any device driver such as device driver system 212 including a volume manager 209 must read and write application host media on every input/output. Not caching blocks ensures that the volume manager 209 will not confuse the two input/output streams, backup and active, that are multiplexed onto the same volume. It is therefore sufficient to direct input/outputs to the active storage 504 or mirror storage 506, as appropriate, when the device driver system 212 is called by the volume manager 208.

In FIG. 5 the path on the left starting at active file system 501 represents input/output on the active file system 501. The path on the right starting at backup file system 502 represents input/output on the backup file system 502 for mapping files or volumes at volume manager 209. The volume manager 209 organizes the data into volumes mapping the data with the devices. The device driver system 212 stores the data on the storage devices on active storage 504 and mirror storage 506 and creates mirror files. Most backup input/output is only pseudo-input/output, because application host disk input/output is not done. The use of pseudo-input/output rather than application host input/output accounts for the efficiency of the mapping method and is explained later together with a more detailed diagram of the full mapping SMS 222.

For example, to backup to a directory /home, which is mounted on another directory /dev/vx/dsk/vol1, the corresponding backup file system name could be something like/backup_home. First, /home is mounted on /dev/vx/dsk/vol1. Input/output for/backup_home is sent to the mirror storage 506, while input/output for /home is sent to the active storage 504.

Figure 6:
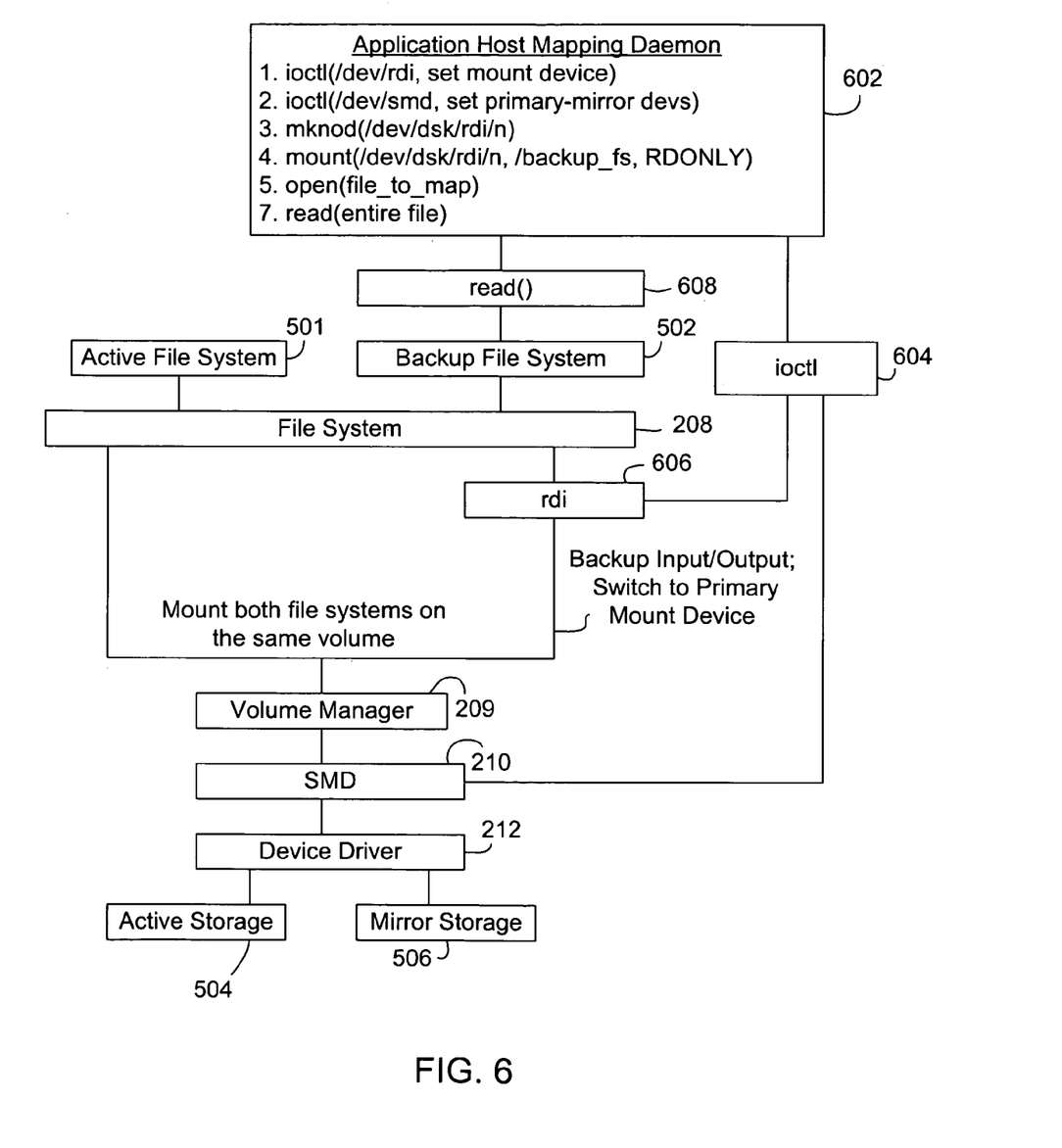
FIG. 6 is a flow diagram of an application host mapping program.

FIG. 6 is a more detailed example of the data flow of FIG. 5. Briefly, an application host mapping daemon 602 communicates with iotcl module 604 to instruct redirect (rdi) driver 606 to redirect input and/or output from the active file system 501 to the backup file system 502. The application host mapping daemon 602 also initiates a pseudo-read using a standard read module 608 with backup file system 502 and file system manager 208, which produces the input/output stream that is redirected by rdi driver 606 to volume manager 209. The input/output stream from volume manager 209 is intercepted by SMD 210 and writes the SEDs to mirror storage 506. In the case of an actual read or write the input/output system of the active file system 501 goes through file system manager 208, where the volume manager 209 directs it via SMD 210 (unaltered) to device driver system 212 to active storage 504.

Two file systems cannot generally be mounted on the same volume because the file system manager 208 will find the active file system 501 mounted on the device with a major/minor number. A check for two file systems being mounted on the same volume is done in the file system manager 208's mount system call. The file system manager 208 has no information regarding which disk is actually involved other than the major/minor number, and therefore allows the backup file system 502 to be mounted on a pseudo-device with a different device number than the primary, and redirects all input/output to the primary mount device. The redirection of input/output could be done by a command such as rdi driver 606 to redirect the input/output stream from one device to another.

Suppose /dev/vx/dsk/vol1 is device (32,7), and 'add_drv rdi' configures rdi driver 606 as major=40. /dev/dsk/rdi/vol1 is created with mknod as (40, 0). The mapping program does ioctl(/dev/dsk/rdi/vol1, SET_DEV, from=(40,0), to=(32,7)) using ioctl 604. SET_DEV means, if called with device 'from=(40,0),' replace device number with 'to=(32,7)' then call device driver for major number 'to=(32,7).'

When rdi driver 606 gets an input/output call to /backup_home at (40,0) it replaces the device number in its argument list with (32,7) and calls the device driver system 212 for major number 32, all other arguments being unchanged. Major 32 is the VxVM driver in this example. All device drivers are in a kernel table indexed by major number.

The statement 'mount /dev/dsk/rdi/vol1 /backup_home' effectively mounts backup_home on /dev/vx/dsk/vol1. The file system manager 208 does not object because it thinks /dev/dsk/rdi/vol1 is a different device—the device number is different. Furthermore the two file systems are completely separate. The file system cache identifies a cached block by device address and device number. If the same offset in /backup/file and /backup_home/file is read simultaneously, the file system will read the block twice from the volume manager and keep a separate copy of each in its cache. Beneath the volume manager one copy will come from the active disk, one from the mirror.

Once the backup file system is mounted on the primary volume, the remaining problem is to generate SEDs while making sure active and mirror input/output goes to the right disks, even though the two file systems are mounted on the same volume.

If the file system is mounted on a raw device the solution is the same. In the ioctl above, the 'to' device is the raw device the active file system is mounted on. The two file systems are effectively mounted on the same raw partition.

To map a volume instead of a file, the /dev/dsk/rdi/vol1 file is mapped directly. That is, open /dev/dsk/rdi/vol1 pseudo-reads the whole volume.

The application host extent generation is done by a simple driver SMD 210 that inserts itself right on top of the device driver system 212. The idea is to trap SEDs by having a mapping program do pseudo-reads through the backup file system. Instead of reading the application host blocks from disk, SMD 210 intercepts the read calls and creates an SED. This is returned in the read input buffer, instead of the data. SMD 210 is loaded at boot time. Entries in the kernel configuration file/etc/system tell SMD 210 which major numbers to shadow. SMD 210 and rdi driver 606 can be two sets of routines in the same driver or two separate drivers.

The backup file system 502 is mounted as read-only on /dev/dsk/rdi/vol1. Mounting the backup file system 502 as read-only ensures that the backup data is not inadvertently modified prior to backup.

The rdi driver 606 records parameters of a data structure buffer that uniquely identify an input/output as being the input/output that has passed through the rdi driver 606. Therefore the parameters of the data structure buffer are a backup file system 502 input/output, and a pseudo-read initiated by the mapping program of application host mapping daemon 602. The identifications of the input/output can be made in various ways that are operating system dependent.

After mounting the backup file system 502 the mapping program of the application host mapping daemon 602 applies ioctl 604 to the SMD 210, which isioctl(/dev/smd, SET_DEV, from_table, to_table).

This ioctl 604 tells SMD 210 if a backup file system (or volume) input/output is identified by the parameters recorded in rdi driver 606 previously. If it is, the device number is looked up in the from_table and replaced with the corresponding entry in the to_table. Then, if the input/output is a read, and the parameters recorded in rdi driver 606 (FIG. 6) identify this as a pseudo-read, and return the read arguments in the read input buffer. The read( ) 608 returns as if the input/output had been done by setting b_resid=0 in the data structure buffer, where b_resid is the number of bytes not successfully transferred. The mapping program of application host mapping daemon 602 sees a successful read( ) 608, but the read buffer contains an SED, not the file data.

The mapping program of application host mapping daemon 602 pseudo-reads the whole file using standard read( ) calls 608. Each read( ) 608 goes through /dev/dsk/rdi/vol1 to /dev/vx/dsk/vol1. VxVM does whatever mapping it needs to, resulting in one or more calls to the device driver system 212, which are trapped by SMD 210. A read that is not a pseudo-read (e.g. an in-node read issued by the file system, when the file to be mapped is opened) and any write( ), falls through to the device driver system 212 and application host input/output is done to active storage 504.

The mapping program reads the file using some form of direct input/output, that is, the read is not buffered in the file system. Buffering imposes unnecessary overhead and may obstruct the ability of rdi 606 and/or SMD 210 to properly identify backup file system input/output.

To map a file system mounted on a raw partition it is necessary to remove the volume manager 606 from the data flow of FIG. 6. Step 1 in the mapping program of the application host mapping daemon 602 specifies the primary raw device. To map a volume step 5 is omitted from this mapping program, and instead a read(entire vol) through the block device /dev/dsk/rdi/ . . . is performed. The step of read(entire file) is also not necessary when mapping a volume.

In one example mapping a file with the rdi driver 606 and SMD 210 gave dev=0x80001b blkno=3696 count=8192 dev=0x80001b blkno=3968 count=16384 dev=0x80001b blkno=3952 count=8192 dev=0x80001b blkno=4048 count=8192 dev=0x80001b blkno=4656 count=16384 dev=0x80001b blkno=5856 count=40960 dev=0x80001b blkno=5952 count=98304 dev=0x80001b blkno=6208 count=2049024 dev=0x80001b blkno=3688 count=1024

In this example the two file systems were mounted on the same raw partition, with no volume manager present. The mirror device was simulated using a dd'd copy of the primary file system partition. The file was deleted from the primary file system partition before mapping. The pseudo-reads of read module 604 do not cause much application host input/output, because the program is primarily just running in and out of the kernel. Some real disk reads are done during a psuedo-read. For example, opening the file requires that a directory block and inode be read. These reads and any other real reads are not trapped by SMD 210. Instead SMD 210 recognizes that these are not pseudo-reads, and does application host disk reads.

The mapping program of the application host mapping daemon 602 obtains inode information according to standard methods such as via stat( ) system calls. Obtaining inode information and the need for some application host reads do not impose much overhead while backing up unless there is a very large number of non-regular files in the backup file system. Using pseudo-reads is advantageous because pseudo-reads can map anything to anything without having to disassemble the internals file system manager 208, and without having to replicate the storage management stack 222 on backup host 104. There is no need to understand how the file system manager 208 and volume manager 209 map a logical extent to storage extents. The trapped SEDs are inherently correct because they are generated by the file system manager 208 and volume manager 209 themselves. Two more steps have to be done before sending the SEDs to backup host 104. It is necessary to replace each SED's device number on the application host with the corresponding device number on backup host 104. This is a simple one-to-one mapping obtained through SYMAPI or an equivalent application. The "backup" prefix is stripped from the file name. Also, the SED is translated from raw partition-relative to raw disk-relative. This requires knowledge of the partition table for each disk, which can be obtained from an ioctl to the disk (see man dkio in Unix systems). The method described here works for any configuration of volume, including mirrored, striped, and RAID5 configurations.

Figure 7:
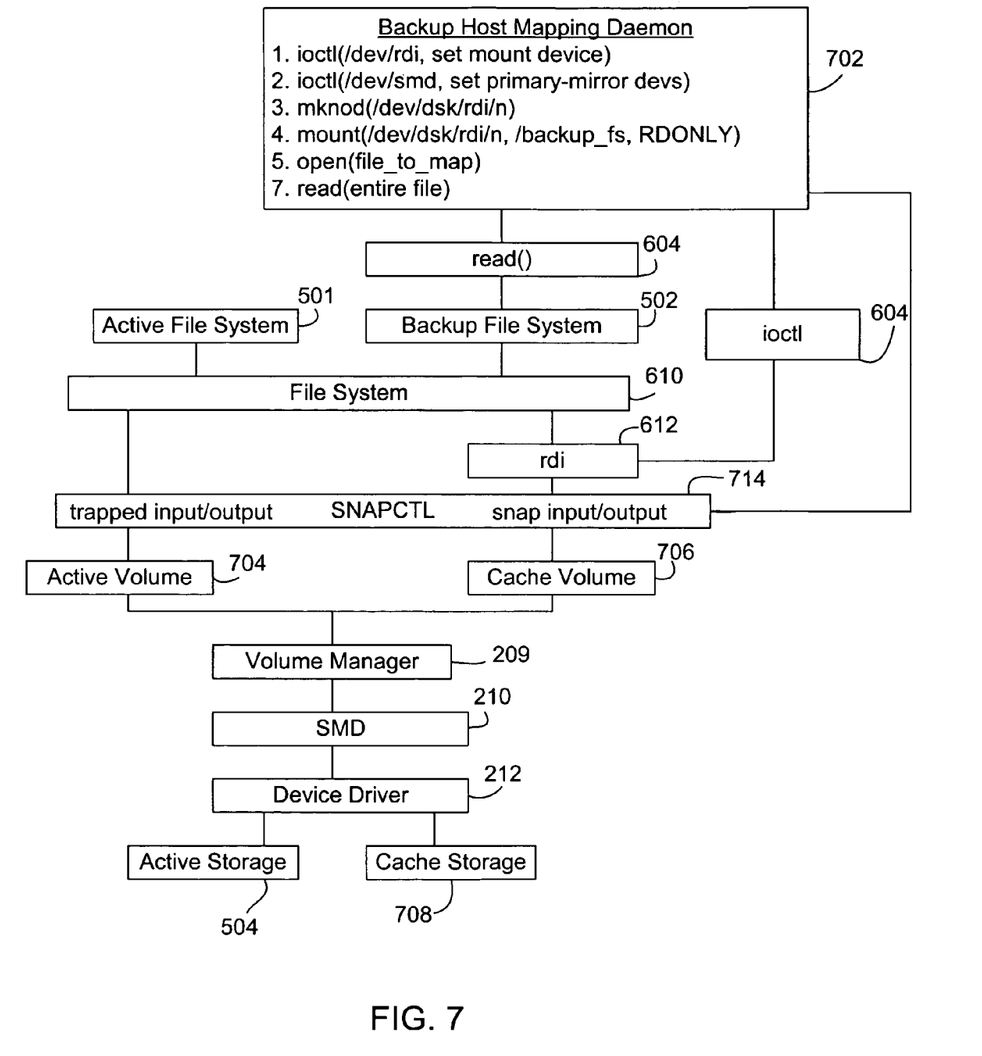
FIG. 7 is a flow diagram of a backup host mapping program.

FIG. 6 is a more detailed example of the data flow of FIG. 5 for an application host mapping program. FIG. 7 shows data flow for a method of mapping objects belonging to another application or that do not have a handle. The method described in conjunction with FIG. 6 will map any object for which an operating system handle exists such as a file, volume, or partition. However, it cannot map a tablespace directly because there is no operating system handle with which to access a tablespace. For example, the mapping program cannot open( ) and read( ) tablespace. For each tablespace object type special code will be needed in the application host mapping program. For tablespaces, the mapping of (database id and tablespace name) to storage objects (e.g., files or volumes or partitions) is kept in a database table that can be queried with the appropriate in-line SQL. To map the data objects belonging to some other application, such as an image processing system, an API that returns the operating system storage handles for the underlying storage occupied by the object can be used:

The following code is required to implement this approach (1) backup host 104 daemon 702;

(2) application host daemon 602; and (3) SMD 210/rdi driver 606.

The backup host 104 receives a list of backup object names from the backup application. It sends the backup object names over a socket to the application host daemon, and gets a (possibly expanded) list of object names back over another socket, each name followed by inode information (uid, dates, size, etc) and SEDs.

The application host daemon 602 receives the backup object names from backup host 104 daemon 702. If the object is a tablespace, the tablespace name is resolved to (file|volume|partition) list via in-line SQL to DBMS. If a directory, get file names via readdir( ).

For files/file systems, the backup file system is mounted as described above. Map files|volumes are mapped, and object names+inode info+SEDs are returned to backup host 104 daemon.

The purpose of FlashBackup is to allow the raw partition to be copied to tape with sequential disk reads across the whole partition. The copying of the raw partition in conjunction with the sequential disk reads reduces the intense input/output that results from depth-first file system traversal when copying file-by-file, especially when there are a large number of files (e.g. millions). The FlashBackup method requires detailed disassembly of disk data structures (which is complex), a fairly large amount of RAM, and temporary disk space while building the file system map. FlashBackup does not map to the application host storage level if the file system manager 208 is mounted on a volume. Instead, mapping is performed relative to the volume, and the volume is copied to tape. The mapping method prototyped for split-mirror as described here makes no attempt to optimize disk input/output. It creates SEDs in the same sequence as does the file system and volume manager. Backup performance on backup host 104 will not be improved over a standard file system backup. Some improvement may result because the mapping method coalesces SEDs, which allows larger disk reads to be done on backup host 104 when files are copied to tape. Detracting from this gain is the additional latency of interactions between the backup host 104 mapping daemon and application host mapping daemon as SEDs are created.

Regarding resource requirements, unlike FlashBackup, the split mirror mapping method does not require much RAM or temporary disk space. A single or dual cpu workstation with moderate RAM that interconnects to the mirror disks is adequate. There is no need to install the primary file system module, volume manager, or database on backup host 104.

Regarding using the present backup system on other platforms, in general both rdi 606 and SMD 210 must call other drivers. On Solaris® this is not a part of the DKI specification, strictly speaking, although layered drivers are widely used (by VxVM for example). The HPUX version of VxVM shows the user how to have the SMD 210 and rdi driver 210 call other drivers. Windows NT® includes the concept of a storage management stack 222 into which 'filter' drivers can be inserted at will, as a formal part of the design. On NT the input/output method is similar to Unix in that a structure (Input/output Request Packet (IRP)) is passed down from driver to driver through the storage management stack 222. Each IRP contains a pointer to the master IRP, which is the IRP created by the highest level driver, namely the file system. Windows NT is better for the needs of the invention than Solaris, because input/outputs on the backup file system can be identified by referring back to the master IRP.

Multiple file systems can be mapped concurrently by mounting each backup file system on a different /dev/dsk/ rdi/ . . . device, allowing for simultaneous mapping of multiple files.

Regarding use with Snapshot, to perform backups from raw devices on another host, but without an SMX-like mirror file system on the primary host, some form of snapshot is useful to correctly map to the application host 108's storage level on an active file system. The snapctl snapshot driver 714 used with FlashBackup can replace SMX. Prior to mounting the backup file system 502 on an rdi device /dev/dsk/rdi/ . . . a snapshot of the active file system would be created with snapon( ) at snapctl snapshot driver 714. The rdi driver 606 is instructed to redirect input/output to the snapshot block device /dev/dsk/snap/n. The data flows from the file system to the rdi drive r 606, then to snapctl 714, then to volume manager 209, then to smd, and then to the device driver system 212. The order of the flow is viable because a snapctl snapshot drive 714 is accessed via special device files that are indistinguishable from the application host's devices.

With this storage management stack 222, rdi drive 606 sets b_private to a magic value as before, but SMD 210 does not switch input/output on the backup file system 504, that is, on the mounted snapshot, to mirror devices because there are not any. Switching of input/output between active partition and cache partition is done by snapctl.

Regarding FIG. 7, an alternative method would involve mounting the backup file system directly on the snapshot block device /dev/dsk/snap/n. The snapctl is currently supported only on Solaris 2.5.1 and later versions. The snapctl 714 is a layered driver and as such, given that layered drivers are not formally supported on Solaris, it performs a few non-standard tasks while inserting itself between the file system and mount device. SMD 210 must also insert itself because it is also a layered driver. However, in contrast, SMD 210 does not need to lock the file system, which simplifies matters. The HPUX-specific code in VxVM provides sufficient information to port snapctl 714 to HPUX. Porting snapctl 714 to is simplified by the NT operating system because layered drivers (filter drivers) are formally supported on NT.

Single host backup is performed using the same mapping method, described above, proposed for a dual-host system except that the backup host 104 daemon 602 (which obtains SEDs from the application host daemon 702) is on the application host.

Regarding performance considerations, not much disk input/output is done on application host 108 on behalf of the application host mapping daemon 702. Opening a file to map will cause the file system to read the directory block and inode from the backup file system. Reading the directory block and inode from the backup file system may impose an increase in load on application host 108 when mapping many small files. If each file is only one block long, for example an e-mail server, then about a third of the total input/output load of the backup will be imposed on the application host. On the application host 108 the operation of reading the directory occasionally coupled with the operation of reading inode constitutes one input/output. On the backup host 104 the operation of reading a block coupled with the operation of writing to tape constitutes two input/outputs. However, for the typical scenario of a database stored in files or volumes, the input/output load imposed on the application host is insignificant. The backup of up a large file involves hundreds or thousands of disk reads and tape writes on the backup host 104 and only a few reads on the application host 108.

The application host mapping daemon 602 obtains inode information for each backup file with stat( ) and sends it to backup host 104 daemon 702. Stat( ) overhead is insignificant because the file inode is already in core memory when stat(fd) is done as a result of opening the file. Stat( ) only copies the inode parameters from the file system inode buffer to the application host daemon stat buffer.

The cpu overhead of pseudo-read trapping is also of interest. Regarding the number of machine instructions executed, a typical file system or disk driver will execute of the order of three to five thousand machine instructions per input/output. The additional load of going through the rdi driver 606 and SMD 210 is insignificant and can be reduced by using a read size=the file system block size (block-based file system) or extent size (extent-based file system). The optimal input/output size can be obtained via fcntl( ).

Process context switching imposes much overhead because the virtual memory mapping of the switched-out process must be restored when the process resumes, together with other components of the process' context. The restoring is not a big problem here because the mapping program does very little application host input/output. Each pseudo-read involves jumping into the kernel and back out without blocking (and therefore context switching) while an application host input/output is done. This overhead can be reduced further by having the mapping program lock itself in core with plock( ). The application host mapping daemon 714 is a very small program with a small data area. It will require only a few pages of application host memory to remain locked in core.

Beyond these observations, the effect of the mapping program on application host performance can be determined accurately by empirically benchmarking a repeatable machine load, both with and without concurrent mapping by the application host daemon 714. Unless the machine load is tightly constrained by available cpu cycles, the mapping overhead will be minor.

Regarding testing this method, each file mapping results in a stream of SEDs, which can be used with lseek( ) and read( ) 608 to create a copy of the file that can be compared against the original. To simulate a mirror file system the original file system manager 208 can be unmounted and copied to a partition of the same size (or volume of the same configuration) with dd. Eventually these tests are done on a heavily loaded system, concurrently with intensive activity on the primary file system, which could be used to test both large-scale systems and desktops. The desktop scenario will involve more paging and caching in the file system, which is an aspect of the test.

Although the present invention has been described in reference to a file system, volume, file system manager 208, and volume manager 209, any organization of memory having a corresponding memory organization manager can be used in addition to or in place of the file system, volume, file system manager 208, and volume manager 209 in application host 108.

The present invention has been explained above with reference to a preferred embodiment. Other embodiments will be apparent to those skilled in the in light of this disclosure. For example, the invention may be used effectively in a configuration having multiple computers, disks, and tapes other than that described above. Therefore, the following claims are intended to cover these and other variations upon the preferred embodiment.

What is claimed is:

1. A computer-implemented system, comprising:
a backup host;
a storage device configured to store data;
an application host configured to manage files, wherein at least a portion of a given one of said files is stored on said storage device;
wherein said application host is configured to generate a data map identifying one or more locations within said storage device at which said at least a portion of said given file is stored;
wherein, in response to receiving a request to back up said given file, said backup host is configured to back up said at least a portion of said given file directly from said storage device to a backup device using said data map, wherein backup data movement between said storage device and said backup device occurs independently of said application host; and
wherein said application host generating said data map for said given file includes said application host executing a mapping utility and a storage mapping driver, wherein said mapping utility is configured to generate read requests of said given file, and wherein in response to receiving a given read request generated by said mapping utility, said storage mapping driver is configured to return information identifying one or more locations within said storage device at which a corresponding portion of said given file is stored.

2. The system as recited in claim 1, wherein said storage device corresponds to a physical device.

3. The system as recited in claim 2, wherein said physical device includes a disk device.

4. The system as recited in claim 2, wherein said one or more locations identified by said data map include one or more device-relative storage extents.

5. The system as recited in claim 4, wherein said one or more device-relative storage extents include a starting device block address, a device block count, and an identifier corresponding to said storage device.

6. The system as recited in claim 1, wherein said storage device corresponds to a volume, wherein said volume includes storage presented by one or more physical devices.

7. The system as recited in claim 6, wherein said one or more locations identified by said data map include one or more volume-relative storage extents.

8. The system as recited in claim 7, wherein said one or more volume-relative storage extents include a starting volume block address, a volume block count, and an identifier corresponding to said volume.

9. The system as recited in claim 1, wherein in response to receiving said given read request generated by said mapping utility, said storage mapping driver is further configured to return said information identifying said one or more locations within said storage device instead of returning file data of said given file.

10. The system as recited in claim 1, wherein said backup host backing up said at least a portion of said given file directly from said storage device to a backup device using said data map includes said backup host issuing one or more read requests directly to said storage device using said data map.

11. The system as recited in claim 1, wherein said application host is configured to implement a storage management stack through which said application host accesses said storage device, wherein said storage management stack includes a device driver configured for interfacing with said storage device and one or more managers configured to translate a file access request to one or more storage device access requests.

12. The system as recited in claim 11, wherein said backup host backing up said at least a portion of said given file directly from said storage device to a backup device using said data map includes said backup host issuing one or more read requests directly to said storage device using said data map, wherein said one or more read requests bypass said one or more managers of said storage management stack.

13. The system as recited in claim 11, wherein said one or more managers include a volume manager configured to organize storage presented by one or more storage devices into a volume, and further configured to translate a volume access request into one or more storage device access requests for processing by said device driver.

14. The system as recited in claim 13, wherein said application host generating said data map for said given file includes said application host executing a mapping utility and a storage mapping driver, wherein said mapping utility is configured to generate read requests of said given file, wherein said storage mapping driver is configured to intercept storage device requests generated by said volume manager in response to read requests generated by said mapping utility, and wherein in response to intercepting a given storage device request, said storage mapping driver is configured to return storage device location information included in said given storage device request for inclusion in said data map.

15. The system as recited in claim 13, wherein said one or more managers include a file system manager configured to manage hierarchy and file attribute information associated with said files, and further configured to translate a file access request into one or more volume access requests for processing by said volume manager.

16. The system as recited in claim 15, wherein said application host generating said data map for said given file includes said application host executing a mapping utility and a storage mapping driver, wherein said mapping utility is configured to generate read requests of said given file, wherein said storage mapping driver is configured to intercept volume access requests generated by said file system manager in response to read requests generated by said mapping utility, and wherein in response to intercepting a given volume access request, said storage mapping driver is configured to return volume location information included in said volume access request for inclusion in said data map.

17. The system as recited in claim 1, wherein said storage device is included within a plurality of storage devices configured to store data, wherein portions of said given file are respectively stored within one or more of said storage devices, and wherein said data map generated by said application host identifies one or more locations within each of said respective one or more storage devices at which corresponding portions of said given file are stored.

18. The system as recited in claim 1, wherein said backup device includes a tape drive.

19. The system as recited in claim 1, wherein said backup device includes a disk device.

20. A computer-implemented method, comprising:
an application host storing at least a portion of a given one of a plurality of files on a storage device;
said application host generating a data map identifying one or more locations within said storage device at which said at least a portion of said given file is stored;
in response to receiving a request to back up said given file, a backup host backing up said at least a portion of said given file directly from said storage device to a backup device using said data map, wherein backup data movement between said storage device and said backup device occurs independently of said application host; and
wherein said application host generating said data map for said given file includes said application host executing a mapping utility and a storage mapping driver, wherein said mapping utility is configured to generate read requests of said given file, and wherein in response to receiving a given read request generated by said mapping utility, said storage mapping driver is configured to return information identifying one or more locations within said storage device at which a corresponding portion of said given file is stored.

21. The method as recited in claim 20, wherein said storage device corresponds to a physical device.

22. The method as recited in claim 21, wherein said physical device includes a disk device.

23. The method as recited in claim 21, wherein said one or more locations identified by said data map include one or more device-relative storage extents.

24. The method as recited in claim 23, wherein said one or more device-relative storage extents include a starting device block address, a device block count, and an identifier corresponding to said storage device.

25. The method as recited in claim 20, wherein said storage device corresponds to a volume, wherein said volume includes storage presented by one or more physical devices.

26. The method as recited in claim 25, wherein said one or more locations identified by said data map include one or more volume-relative storage extents.

27. The method as recited in claim 26, wherein said one or more volume-relative storage extents include a starting volume block address, a volume block count, and an identifier corresponding to said volume.

28. The method as recited in claim 20, further comprising:
in response to receiving said given read request generated by said mapping utility, said storage mapping driver returning said information identifying said one or more locations within said storage device instead of returning file data of said given file.

29. The method as recited in claim 20, wherein said backup host backing up said at least a portion of said given file directly from said storage device to a backup device using said data map includes said backup host issuing one or more read requests directly to said storage device using said data map.

30. The method as recited in claim 20, wherein said application host is configured to implement a storage management stack through which said application host accesses said storage device, wherein said storage management stack includes a device driver configured for interfacing with said storage device and one or more managers configured to translate a file access request to one or more storage device access requests.

31. The method as recited in claim 30, wherein said backup host backing up said at least a portion of said given file directly from said storage device to a backup device using said data map includes said backup host issuing one or more read requests directly to said storage device using said data map, wherein said one or more read requests bypass said one or more managers of said storage management stack.

32. The method as recited in claim 30, wherein said one or more managers include a volume manager configured to organize storage presented by one or more storage devices into a volume, and further configured to translate a volume access request into one or more storage device access requests for processing by said device driver.

33. The method as recited in claim 32, wherein said application host generating said data map for said given file includes said application host executing a mapping utility and a storage mapping driver, wherein said mapping utility is configured to generate read requests of said given file, wherein said storage mapping driver is configured to intercept storage device requests generated by said volume manager in response to read requests generated by said mapping utility, and wherein in response to intercepting a given storage device request, said storage mapping driver is configured to return storage device location information included in said given storage device request for inclusion in said data map.

34. The method as recited in claim 32, wherein said one or more managers include a file system manager configured to manage hierarchy and file attribute information associated with said files, and further configured to translate a file access request into one or more volume access requests for processing by said volume manager.

35. The method as recited in claim 34, wherein said application host generating said data map for said given file includes said application host executing a mapping utility and a storage mapping driver, wherein said mapping utility is configured to generate read requests of said given file, wherein said storage mapping driver is configured to intercept volume access requests generated by said file system manager in response to read requests generated by said mapping utility, and wherein in response to intercepting a given volume access request, said storage mapping driver is configured to return volume location information included in said volume access request for inclusion in said data map.

36. The method as recited in claim 20, wherein said storage device is included within a plurality of storage devices configured to store data, wherein portions of said given file are respectively stored within one or more of said storage devices, and wherein said data map generated by said application host identifies one or more locations within each of said respective one or more storage devices at which corresponding portions of said given file are stored.

37. The method as recited in claim 20, wherein said backup device includes a tape drive.

38. The method as recited in claim 20, wherein said backup device includes a disk device.

* * * * *